(12) United States Patent
Wafler

(10) Patent No.: US 7,711,187 B2
(45) Date of Patent: May 4, 2010

(54) METHOD FOR SELECTION AND DISPLAY OF IMAGES

(76) Inventor: Walter Wafler, 43 Wood Hill Rd., Pittsford, NY (US) 14534

( * ) Notice: Subject to any disclaimer, the term of this patent is extended or adjusted under 35 U.S.C. 154(b) by 995 days.

(21) Appl. No.: 11/225,760

(22) Filed: Sep. 13, 2005

(65) Prior Publication Data

US 2007/0058932 A1 Mar. 15, 2007

(51) Int. Cl.
*G06K 9/34* (2006.01)
(52) U.S. Cl. .................. 382/173; 348/333.05; 386/126
(58) Field of Classification Search .................. 725/135, 725/136; 348/207.11, 211.14–211.99, 333.05, 348/461, 468, 552; 707/104.1; 382/171–173; 386/124–126
See application file for complete search history.

(56) References Cited

U.S. PATENT DOCUMENTS

| 6,784,925 | B1* | 8/2004 | Tomat et al. | 348/207.11 |
| 7,298,895 | B2* | 11/2007 | Loui et al. | 382/171 |
| 2003/0035055 | A1* | 2/2003 | Baron | 348/231.4 |
| 2004/0073949 | A1* | 4/2004 | Chen et al. | 725/135 |

* cited by examiner

*Primary Examiner*—Thai Tran
*Assistant Examiner*—Mishawn Dunn
(74) *Attorney, Agent, or Firm*—Brown & Michaels, PC

(57) ABSTRACT

A method for efficiently allowing users to select or view images from a large quantity of images that are stored on various medias. The method groups images according to specific parameters and displays a sub set of these parameters allowing users to quickly select or determine if the image that they are seeking is in that particular storage area or media.

3 Claims, 5 Drawing Sheets

METHOD FOR SELECTION AND DISPLAY OF IMAGES

BACKGROUND OF THE INVENTION

1. Field of the Invention

The invention pertains to the field of image selection and manipulation. More particularly, the invention pertains to methods for selecting and displaying a subset of images to be displayed to enable the user to see what images or pictures are contained within an image storage system.

2. Description of Related Art

CD's, DVD's, Zip drives are often used for storage of images. One particular issue is how to enable the user to quickly and efficiently determine what is stored on a particular disk or storage device. With the capacity of these devices exceeding 100 MB it is possible to store 100's if not 1000's of images on them. Once the images are on the disk it is not possible for the user to determine what is on it except by either reading the label or inserting the disk in a computer and reading what is on it. To remedy this system it is possible to print small or "thumb nail" image of each of the pictures or images on the disk or create a label for either the disk or its case. The available printing space on a CD disk would limit the number of printed thumb nails to approximately 26 reasonable sized thumbnails and an average CD would contain up to 2000 images (depending on image size, resolution and compression ratios) thus it would be difficult to determine what images are on the disk base on printing just the first or last 26 images.

Images are also stored on hard disk drives, disk arrays or other on line storage locations, capacities of these drives range from 100 MB to well over 200 GB which would equate to 100 to 300,000 images depending on size. If customers use either a picture search program or some type of ad hoc scheme for organizing images or pictures, it is possible sort or group images by key parameters and return list or group based on the criteria entered. This method typically returns a large number of images that the user must sort through to find the desired image or images.

SUMMARY OF THE INVENTION

The invention presents a method for efficiently allowing users to select or view images from a large quantity of images that are stored on various medias. The method groups images according to specific parameters and displays a sub set of these parameters allowing users to quickly select or determine if the image that they are seeking is in that particular storage area or media.

The image storage system can be a wide rage of devices including but not limited to CD's DVD's hard disks, disk arrays or computer memory. The method selects a range of images that are representative of a range of time, place or some other characteristic that would enable the user to better understand what is contained in the storage entity without the system having to display all images in the storage system.

DETAILED DESCRIPTION OF THE INVENTION

To simplify process of determining what images or pictures are on a specific disk or in a storage location images are grouped based on a single or series of parameters, identifying when the content changes and based on the desired number or available space select a representative sub set of images to be printed or displayed. Users could simply select which images are to be printed on the CD or on the label but often this would be a time consuming process to sort through numerous images.

Basic automatic selection methods could include be very simple such as every Nth image (where N is the total number of images divided by the number of possible locations) or more complex depending on what the user selects as criteria or what the system designer pre programs. These more complex methods could be configured in such a way as to allow the user to quickly identify what is on the disk or with in the particular storage area. The method inputs include the total number of images to be displayed and a hierarchy of what parameters the user would like the content to be displayed on and if they want first and last image or just first image.

Figure 1:
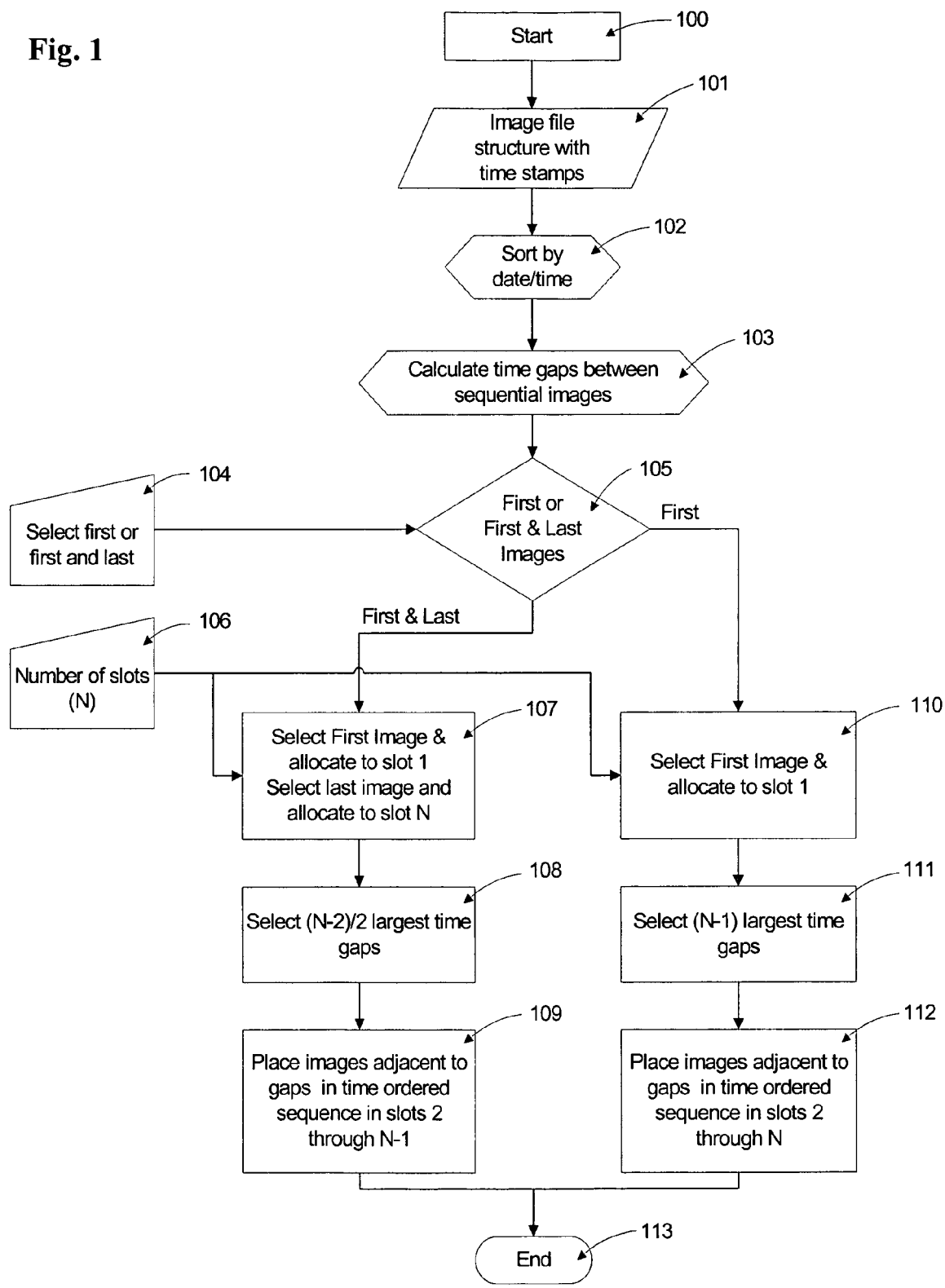
FIG. 1 shows Flow Chart of Time Based Selection Algorithm for CD's & Labels

FIG. 1 shows a flowchart of the method of the invention.

100. The method starts in step 100, 101. the images are stored in a structure with time stamps associated with each image.

102. the images are sorted by date then time ordering them chronologically.

103. calculate the time gap between each image.

104. the user or programmer selects if only the first or if both the first and last images of a sequence will be displayed.

105. Using this selection from step 104 the method would branch to the first only or first and last sections of the method 106. The user or programmer supplies the number of available image locations 107. The chronologically first image is placed or allocated to slot 1 and the last chronological image is placed in slot N where N is the total number of image slots or locations to display images.

108. Once step 107 is complete, the method selects the (N−2)/2 largest time gaps, these gaps represent the most likely significant changes in image capture sequences.

109. selects the 2 images adjacent to these selected time gaps and places them in chronological sequence in slots 2 through N−1.

110. For a system that displays only the first image, place or allocate the first chronological image to slot 1.

111. Once complete, the method selects the N−1 largest time gaps, these gaps represent the most likely significant changes in image capture sequences.

112. select the 1 image after N−1 largest time gaps and place them in chronological sequence in slots 2 through N.

113. The method ends once all of the available image slots are filled.

Figure 2:
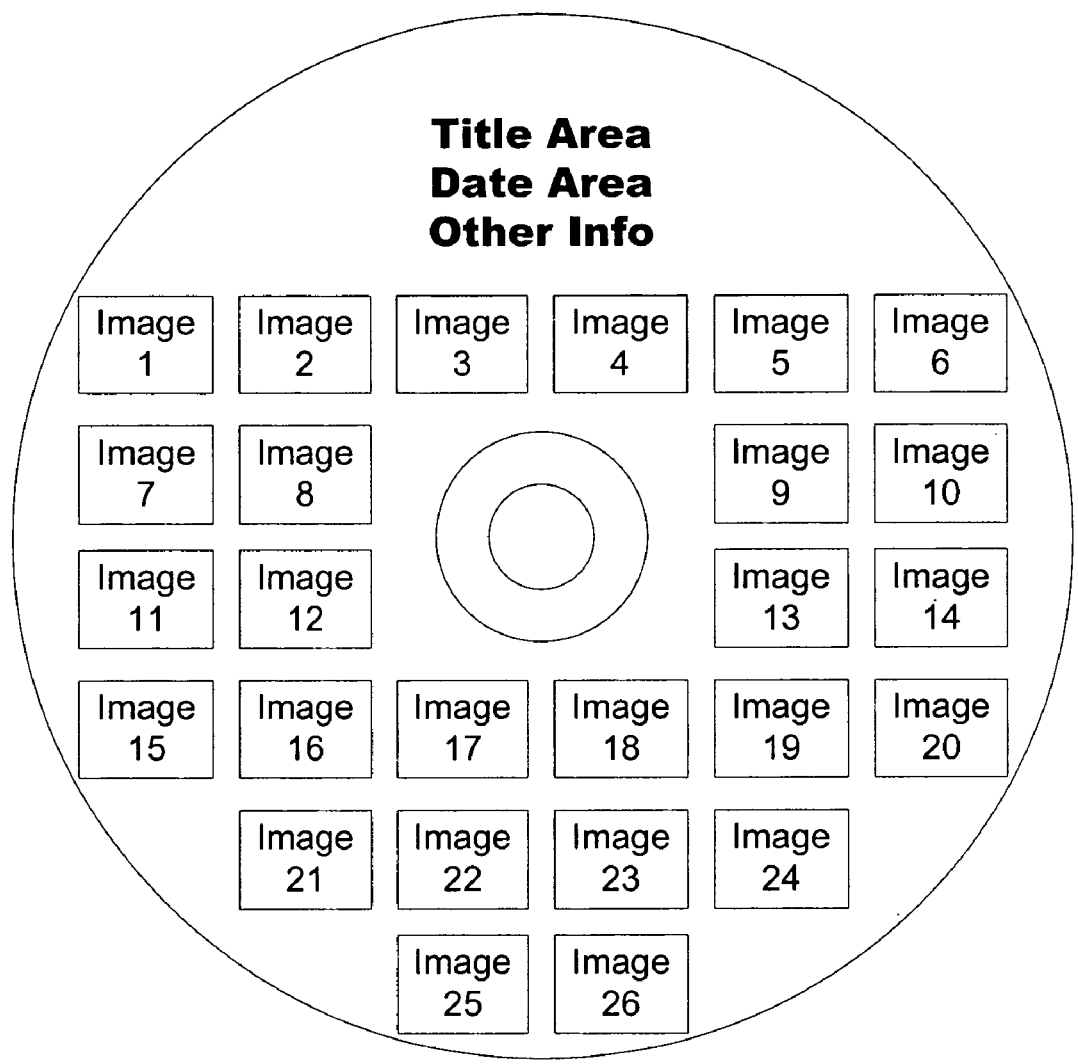
FIG. 2 shows CD with images
Figure 3:
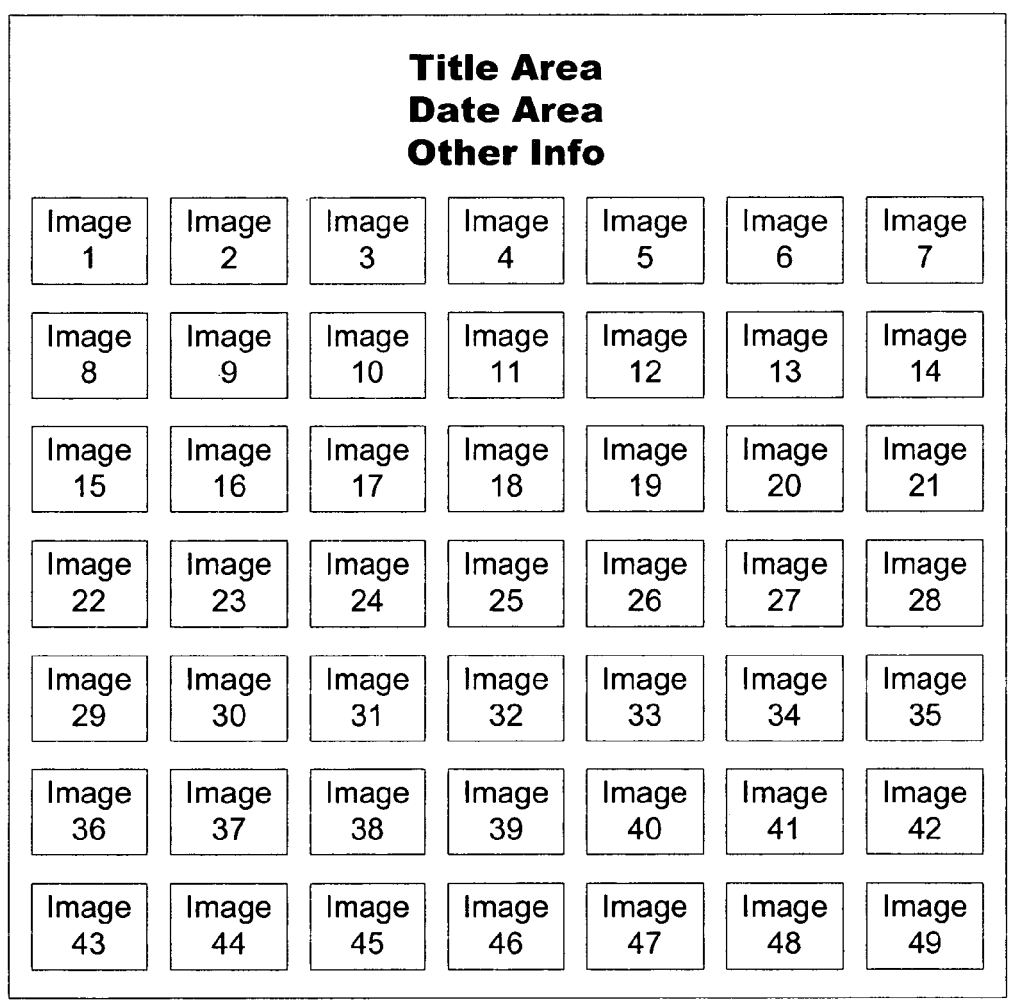
FIG. 3 shows label with images

For example if the system was to be used to select images to be printed on a CD with 26 possible thumbnail locations (as shown in FIG. 2) out of a total of 500 images and the key parameter that the user would like to sort on would be time/date and first and last image of each grouping. The method would select the first image (based on time) placed at location 1, last image (based on time) placed at location 26, then the method would look for gaps in time, building a small data base of where the gaps are and what the duration of gaps are.

The method would then select the largest 11 gaps, selecting the last image and the first image adjacent to these gaps in time. By placing these remaining 22 images in chronological order the user would quickly and easily understand what the overall set of images are on the disk or in the storage location. This method works well for typical consumer users of digital photography as they typically take pictures based on specific events spaced in time and it is typically how users remember and wish to sort or retrieve images. The first & last images of each time gap are usually representative or indicative of the remainder of the pictures in that time sequence.

The method can be modified or adjusted to deal with other parameters depending on how the user wants to store the images. The parameters used for selection could include a side rage of parameters including but not limited to: time, place (either named or on coordinates), image content, color balance, imbedded meta data (such as camera type, photographic parameters (f stop, shutter speed, flash, image processing algorithm, etc)), image size, compression type, photographer, key words, or any combination of these or any other parameter that a system could sort on. Once the thumbnails are printed on the disk or disk label it is easy for a user to sort through a series of disks and understand quickly what is on the disk.

Figure 4:
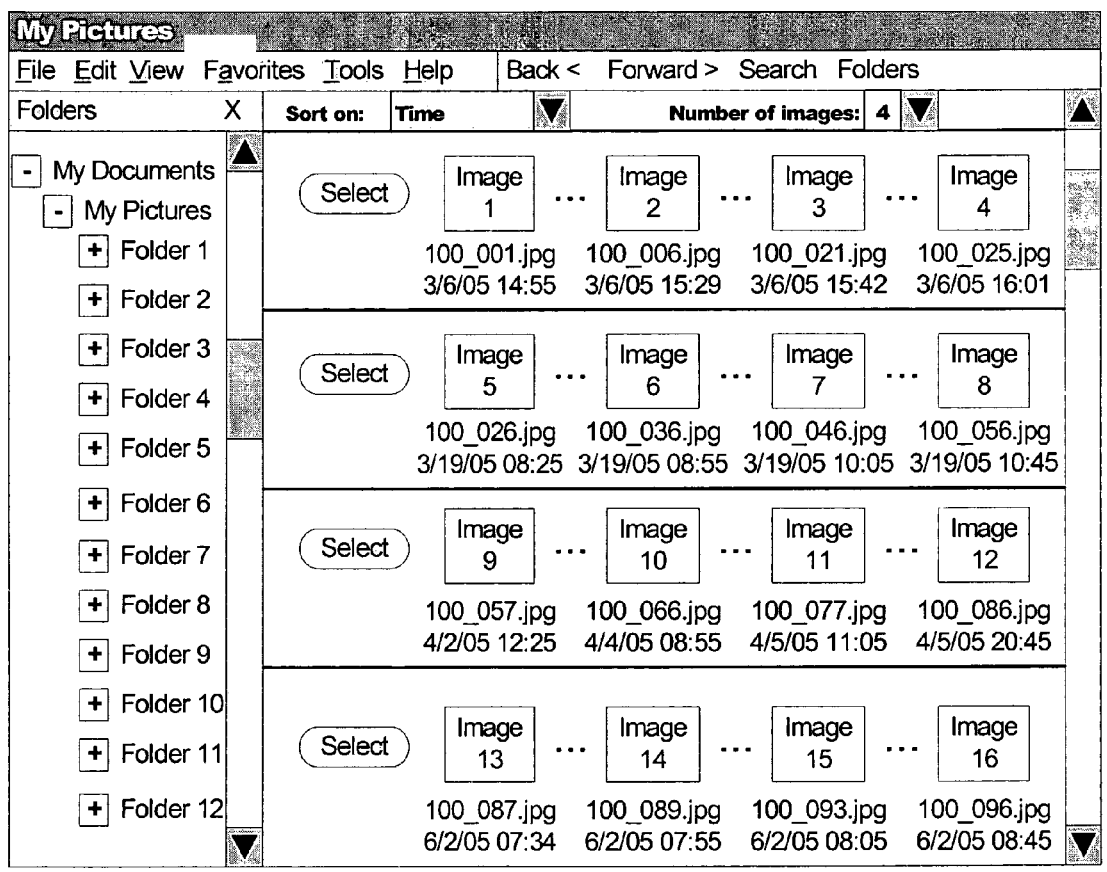
FIG. 4 shows Screen Display with Time Based Selection

For systems where the images are stored on a hard disk or other type of online storage same types of methods could be used. One method would be to display N number of pictures in a group representing what is in the particular file/folder or memory location. The user or programmer could also select the size of the time gap to group images on. On-screen displays could have any number of pictures displayed to represent a group of pictures, as shown in FIG. 4. The number of displayed images would be a function of either an user selection or how the system would be laid out by the designer/programmer. As the images are online or accessible it would be possible to open the file location by simply selecting that group thus opening up that file location or area. This would access the sub set of images in any number of applications to view edit or manipulate. This would greatly improve the ability of users to quickly locate or retrieve specific images amongst hundreds or thousand of images.

Figure 5:
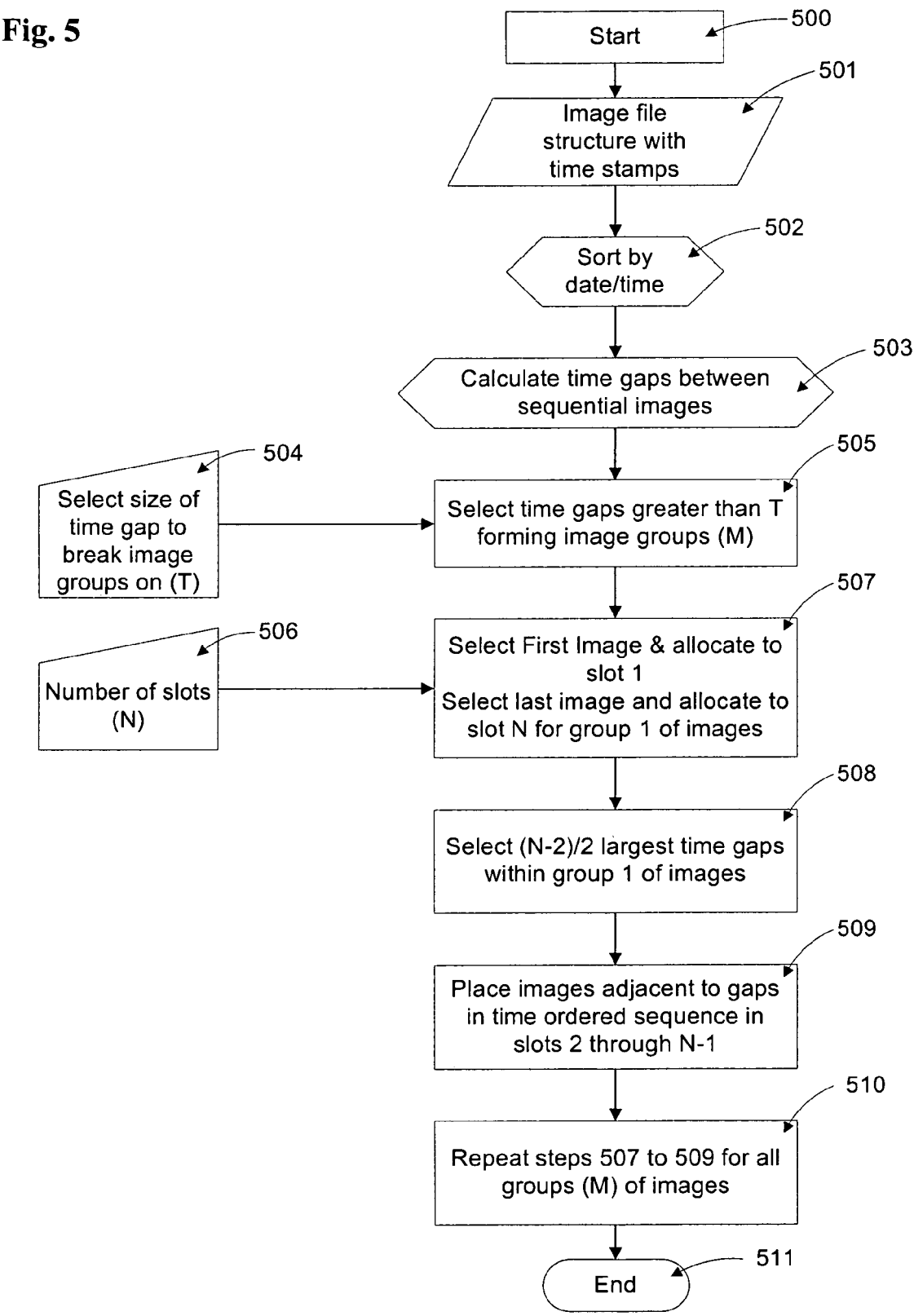
FIG. 5 shows Flow Chart of Time Based Selection Algorithm for computer systems

FIG. 5 shows a flowchart of the method of the invention for screen displays.

500. The method starts in step 500
501. the images are stored in a structure with time stamps associated with each image
502. the images are ordered chronologically.
503. calculate the time gap between each image.
504. The user or programmer selects the size of the time gap (T) on which to group the images.
505. the method selects time gaps greater than the time T forming M chronological groups of images.
506. The user or programmer supplies the number of available image locations or slots to be displayed to the user.
507. the chronologically first image form the first group of images is placed or allocated to slot 1 and the last chronological image from the first group 1 is placed in slot N where N is the total number of image slots or locations to display images.
508. Once step 507 is complete the method selects the (N−2)/2 largest time gaps.
509. select the 2 images adjacent to these selected time gaps and places them in chronological sequence in slots 2 through N−1.
510. Repeat steps 507 through 509 for all M groups in group chronological order.
511. The method ends once all of the groups and images have been allocated to slots. This technique can be extended to deal with images that have been assigned key words or previously cataloged images. For example if there is a group of pictures with key words assigned such as animal type, the method could be modified to group the images based on the specific keyword where all the images with "cat" would be grouped together followed by "dog" followed by "elephant".

This method is applicable for use in personal photo archiving or storage, as well as useful for archiving and storage of catalog photos, stock photography or any system where there is a significant quantity of images to be sorted.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of selecting images from a group of images stored on a CD or DVD for displaying in a plurality of locations on the CD or DVD or a label therefor, the locations being denoted as location 1 through location N, where N is the total number of locations and wherein N is less than the total number of possible images to be displayed, comprising the steps of:
   a) storing the images in a structure with time stamps associated with each image;
   b) automatically sorting the images by date, then time ordering the images chronologically by date;
   c) calculating a time gap between each image;
   d) allocating a chronologically first image to location 1;
   e) selecting a quantity of largest time gaps between the images to generate a sequence of images, each sequence of images being separated by the largest time gaps;
   f) selecting a first, last or first and last image from each sequence of images;
   g) selecting, if only the first, last or first and last images from each sequence of images will be displayed, is N−1 if only the first or last image is selected, and N−2/2 if both the first and last images are selected;
   h) allocating the images selected in step (g) in chronological sequence to unallocated locations after the first location; and
   i) displaying the images in the total number of locations on the CD or DVD.

2. The method of claim 1, further comprising the step of supplying N, the number of available image locations.

3. The method of claim 1, further comprising the step of preselecting images to which the selection of the method will be applied, based on at least one parameter selected from the list comprising time, place, image content, color balance, embedded metadata, camera type, photographic parameters, f-stop, shutter speed, flash, image processing algorithm, image size, compression type, photographer, and keywords.

* * * * *